United States Patent
Corves et al.

(10) Patent No.: US 10,279,327 B2
(45) Date of Patent: May 7, 2019

(54) ORBITAL SHAKER WITH BALANCING DEVICE

(71) Applicant: ADOLF KÜHNER AG, Birsfelden (CH)

(72) Inventors: Burkhard Corves, Hergenrath (BE); Mathias Schumacher, Lörach (DE); Jochen Büchs, Aachen (DE); Wolf Klöckner, Köln (DE)

(73) Assignee: ADOLF KÜHNER AG, Birsfelden (CH)

(*) Notice: Subject to any disclaimer, the term of this patent is extended or adjusted under 35 U.S.C. 154(b) by 165 days.

(21) Appl. No.: 15/502,260

(22) PCT Filed: Jul. 20, 2015

(86) PCT No.: PCT/EP2015/066518
§ 371 (c)(1),
(2) Date: Sep. 14, 2017

(87) PCT Pub. No.: WO2016/020176
PCT Pub. Date: Feb. 11, 2016

(65) Prior Publication Data
US 2018/0008943 A1    Jan. 11, 2018

(30) Foreign Application Priority Data

Aug. 7, 2014    (DE) .................. 10 2014 111 236

(51) Int. Cl.
*B01F 11/00*    (2006.01)
*F16F 15/36*    (2006.01)

(52) U.S. Cl.
CPC ........ *B01F 11/0014* (2013.01); *F16F 15/363* (2013.01); *B01F 2215/0036* (2013.01)

(58) Field of Classification Search
CPC .......... B01F 11/0014; B01F 2215/0036; F16F 15/363
USPC ................................................ 366/209, 216
See application file for complete search history.

(56) References Cited

U.S. PATENT DOCUMENTS

| | | | |
|---|---|---|---|
| 2,405,404 | A | 8/1946 | Clark |
| 4,109,319 | A | 8/1978 | Brandt |
| 5,142,936 | A | 9/1992 | McGale |
| 5,558,437 | A | 9/1996 | Rode |
| 8,226,291 | B2 | 7/2012 | Zamirowski |

(Continued)

FOREIGN PATENT DOCUMENTS

| | | |
|---|---|---|
| DE | 19749357 A1 | 6/1998 |
| EP | 2450099 A1 | 5/2012 |

(Continued)

*Primary Examiner* — Anshu Bhatia
(74) *Attorney, Agent, or Firm* — Lucas & Mercanti, LLP (57) ABSTRACT

An orbital shaker with a balancing device that automatically and passively compensates, without supply of external energy, forces and moments which are caused by imbalance and arise during operation, in particular as a result of a possible variable loading (mass, geometry of the containers, properties of the contents) and variable operating parameters (speed of rotation and shaking radius). The balancing device can be designed such that only the unbalance forces (static balancing) and/or the unbalance moments (dynamic balancing) are compensated.

24 Claims, 7 Drawing Sheets

(56) References Cited

U.S. PATENT DOCUMENTS

| | | | |
|---|---|---|---|
| 2004/0151064 A1* | 8/2004 | Yi | B01F 11/0005 366/209 |
| 2006/0002228 A1* | 1/2006 | Schulz | B01F 9/0001 366/209 |
| 2011/0052113 A1 | 3/2011 | Tanner | |
| 2012/0140589 A1 | 6/2012 | Schafrinski | |

FOREIGN PATENT DOCUMENTS

| | | | |
|---|---|---|---|
| WO | 0029122 | A1 | 5/2000 |
| WO | 0208630 | A2 | 1/2002 |

* cited by examiner

ORBITAL SHAKER WITH BALANCING DEVICE

CROSS-REFERENCE TO RELATED APPLICATONS

This present application is a 371 of International application PCT/EP2015/066518, filed Jul. 20, 2015, which claims priority of DE 10 2014 111 236.9, filed Aug. 7, 2014, the priority of these applications is hereby claimed and these application are incorporated herein by reference.

BACKGROUND OF THE INVENTION

The invention pertains to an orbital shaker.

During the operation of orbitally shaken bioreactors, imbalance-caused forces and moments develop in use, which depend on the variable loading of the shaker table (mass and geometry of the containers, properties of the contents, and also the mass and location of the center of gravity of the shaker table), on the shaking diameter, and on the shaking frequency, among other factors. These imbalances lead to undesirable vibrations of the orbital shaker, to increased wear, to noise pollution, and to deviations from the defined shaking path. As a result, these effects limit the maximum possible shaking frequency for a given load and a given shaking diameter. For some bioengineering processes, however, high shaking frequencies are necessary to ensure that the cultures are supplied with enough oxygen and that sufficient mixing is achieved.

To keep the exciting imbalance forces and moments as low as possible, balancing weights can be attached to orbital shakers. But because both the loading of the shaker table (in particular the mass of the table and the location of its center of gravity) and the shaking diameter often change, rebalancing is required every time one of these parameters is changed.

Orbital shakers commercially available today usually do not offer any possibility of adapting the balancing state to the variable loading.

Only a few manufacturers offer the possibility of manually adjusting compensating weights to balance the system.

U.S. Pat. No. 8,226,291 B2 discloses an orbital shaker with a balancing device, in which the angle between two compensating masses arranged symmetrically in a balancing plane underneath the shaker table can be manually adjusted, so that the resulting radial centrifugal force can be varied.

In the shakers available on the market, it is not possible to vary the adjustment of the compensating masses in a continuously variable manner. It is impossible to fine-tune the balancing device, and the maximum possible rotational speeds are therefore limited. To carry out the manual balancing disclosed in U.S. Pat. No. 8,226,291, it is necessary to partially disassemble the orbital shaker, which demands a certain amount of technical know-how. In addition, this adjusting work takes time. The disadvantages of the prior art have the result that the manual adjustment of the compensating masses is not carried out in practice every time there is change in the load or in the shaking diameter. The maximum possible shaking frequencies are therefore severely limited. This limitation of the maximum shaking frequency has a negative influence on some bioengineering processes. In addition, the vibrations lead to considerable wear and to increased noise pollution.

U.S. Pat. No. 8,226,291 B2 also discloses an automatic positioning of the compensating masses in a balancing plane by means of a servomotor. To control the position of the compensating masses automatically, sensors and a control unit are required. This is therefore an active system with automatic positioning of the compensating masses.

The active automatic balancing described in U.S. Pat. No. 8,226,291 B2 is associated with high acquisition costs and the danger of the failure of the required sensors, of the actuating mechanisms, and/or of the electronic circuitry. The failure of an orbital shaker is usually associated with the loss of the shaken culture. Depending on the experiment, the failure of an orbital shaker in a research laboratory can lead to the loss of several weeks of work. This results in direct costs for personnel and the use of the laboratory. Consequential costs can arise through delays in the market introduction of the product being investigated. If an orbital shaker fails during production, considerable downtime costs are incurred as a result of the loss of product.

The adjusting of the compensating masses described in U.S. Pat. No. 8,226,291 B2 can compensate only for the imbalance force. There is no additional ability to compensate for the imbalance moment attributable to the vertical distance between the balancing plane and the center of gravity of the load.

U.S. Pat. No. 5,558,437 discloses a dynamic compensation of the imbalance force and of the imbalance moment. Two balancing planes are provided underneath the shaker table. In the upper balancing plane, the compensating weight is located on the opposite side of the joint linkage to the shaker table, this linkage being arranged eccentrically to the rotational axis of the rotor. In the lower balancing plane, the compensating weight is located on the same side as the joint linkage to the shaker table, the linkage again being arranged eccentrically to the rotational axis of the rotor. By tuning the parameters (radial distance, mass of the weights and vertical distance), the system can be balanced in such a way that the imbalance force and the imbalance moment are compensated. No provisions are made for a manual or automatic adjustment of the parameters nor for an adaptation to the variable loading of the shaker table.

SUMMARY OF THE INVENTION

An object of the invention is to provide and orbital shaker with a balancing device which makes it possible to carry out an automatic and operationally reliable balancing with relatively little effort. It is also an object of the invention to provide a dynamic balancing.

The object is met by reducing at least the centrifugal forces arising during operation of the shaker and/or the resulting moments by a balancing device for the automatic compensation of imbalance-caused forces and/or moments. In contrast to automatic active compensation, no actuating energy, no sensors, and no control unit are required to position the compensating masses for this automatic compensation. In comparison to the known automatic active system, this results in a significant improvement in operational reliability, especially because the solution according to the invention completely eliminates electronic and electrical components for the imbalance compensation.

By offering automatic compensation of imbalance-caused forces and/or moments, the orbital shaker according to the invention makes it possible to use much higher shaking frequencies and thus to provide a better oxygen supply and better mixing of the material being shaken. At the same time, the wear of the individual parts of the orbital shaker and the amount of noise generated are also reduced. Finally, the automatic compensation of imbalance-caused forces and/or moments brings about a more exact adherence to the circular path of movement of the shaking table.

In detail, the object is achieved by an orbital shaker with a balancing device comprising the following features for the automatic compensation of imbalance-caused forces and/or moments:

at least one balancing plane perpendicular to the rotational axis;

at least one orbit arranged in each balancing plane, concentric to the rotational axis;

several freely movable compensation masses arranged in each orbit;

a rotational damping mechanism, which is set up in such a way that, when there is a deviation between the rotational speed of the compensating masses and the rotational speed of the rotor around the rotational axis, a moment acts on the compensating masses; and a guide system, which is set up in such a way that the guide system allows the rotor to move only within a plane perpendicular to the rotational axis and/or to tilt around two axes which are at right angles to each other and are in a plane perpendicular to the rotational axis.

The compensating masses are necessary to compensate for imbalance-caused forces and/or moments. So that both the absolute value and the direction of the compensating force or compensating moment correspond to the active imbalance force or imbalance moment, at least two compensating masses are required. The compensating masses can be, for example, balls, rollers, pendulums, or even fluids.

The compensating masses must have a certain degree of freedom of movement, so that they can arrange themselves during the balancing process in such a way that they compensate for the imbalance in question. This degree of freedom is made possible in that each compensating mass is positively guided on an orbit arranged concentrically around the rotational axis of the rotor but is freely movable in the direction of the orbit.

The rotational damping mechanism has the effect that, when there is a difference between the rotational speed of the rotor and that of the compensating masses, a moment acts on the compensating masses, which ensures that the rotational speed between the rotor and the compensating masses is equalized.

For the automatic positioning of the compensating masses, finally, it is necessary to have a guide system for the rotor. If only imbalance-caused centrifugal forces are to be compensated, it is sufficient for the guide system to be set up to allow free movement of the rotor within a plane perpendicular to the rotational axis. If, in addition, imbalance moments are to be compensated, it is also necessary to have a circular guide system, which is set up to allow a tilting of the rotor in two axes which are at right angles to each other and are in a plane perpendicular to the rotational axis.

At normal operating speeds, the rotor of the orbital shaker operates in the supercritical range. As a result, a phase angle of approximately 180° between the exciting force and the resulting movement of the orbital shaker is obtained. If, therefore, the effective imbalance and thus the imbalance force is pointing in the positive X direction, the rotor arranged on the linear guide system and the shaking table articulated to it are deflected in the negative X direction. The guide system makes this resultant movement of the rotor possible. If, in addition, imbalance moments are compensated, the circular guide system makes it possible for the rotor and the shaking table articulated to be deflected in the required opposite direction.

If, in one embodiment of the invention, the drive is configured as an electric motor with a stator and with the rotor as a movable part, the orbital shaker can have a quite compact design. In particular, there is no need for a mechanical traction drive, for example, to transfer the rotational movement from the drive to the rotor and thus to make the rotor turn around its rotational axis.

The rotor of the drive is preferably configured as an external rotor with a plurality of permanent magnets and is driven by the several electromagnets of the stator. The drive is preferably mounted on a drive stand. The drive stand can be configured as, for example, a plate, to which the stator of the drive is attached. The rotor is connected in particular to the drive stand by roller bearings.

The rotary joint which connects the rotor and the shaking table to each other so that they are free to rotate around the joint axis, which is offset from, and parallel to, the rotational axis, comprises in an advantageous embodiment of the invention a pivot pin, which defines the joint axis and is arranged eccentrically to the rotational axis, and a bearing, which accepts the pivot pin and allows it to rotate. To reduce the friction in the rotary joint and thus the drive power, the bearing holding the pivot pin is preferably configured as a roller bearing.

So that the diameter of the orbit of the shaker table can be changed as a function of the load, it is possible in an advantageous embodiment of the invention to adjust the parallel offset—also called the eccentricity—between the rotational axis of the rotor and the joint axis of the rotary joint. The parallel offset between the axes can be changed by shifting the pivot pin of the rotary joint. In particular, when the rotor is configured as an external rotor, the pivot pin can be easily mounted on the upward-facing end surface of the external rotor with a different parallel offset to the rotational axis.

To limit the degree of freedom of each compensating mass on an orbit in the balancing plane, a circular guide, which is set up to guide the compensating masses on the orbit, is arranged on the rotor along each orbit. A compact and favorable structure for a circular guide of this type is achieved by configuring the circular guide as ring-shaped cavity, in which the compensating masses, configured in particular as rolling elements, move. The rotational damping mechanism for damping of the compensating masses, especially spherical ones, can be especially easily realized in this embodiment by fluid filling the ring-shaped cavity, especially an oil. The damping properties of this rotational damping mechanism can be easily adapted to specific requirements of the orbital shaker by filling the cavity with fluids of different viscosities. Thus in this embodiment the rotational damping mechanism requires no additional space and can also be realized at low cost.

To improve the balancing results, at least two ring-shaped cavities with different diameters are, in one embodiment of the invention, arranged in each balancing plane concentrically around the rotational axis, wherein the ring-shaped cavities are filled with fluids, especially oil, of different viscosities. The ring-shaped channel filled with the higher-viscosity fluid is used for coarse balancing, and the ring-shaped channel filled with the lower-viscosity fluid is used for fine balancing.

Another improvement of the balancing results can be achieved by dividing each circular guide into at least two segments, each consisting of part of a circle, and by arranging at least one of the compensating masses with freedom to move on the orbit in each segment. The segmentation prevents balls from coming in contact with each other and forming groups, which hinder the balls from positioning themselves on the orbit, in particular in the ring-shaped cavity.

So that the compensating masses can be guided in freely movable fashion on an orbit, an alternative embodiment of the invention includes compensating masses configured as pendulums, wherein each pendulum is supported outside its center of mass to rotates around its rotational axis. The short frictional lever arm leads to good balancing results. The required rotational damping mechanism between the rotor and each pendulum can be configured in this embodiment as an eddy-current coupling and/or hydraulic rotational damper. The eddy-current coupling is based on the principle of the relative movement between a metallic, electrically conductive body and an inhomogeneous external magnetic field. The relative movement induces eddy currents in the metallic body, which generate their own magnetic fields, opposite to the external magnetic field; it is these eddy current-generated fields which produce the rotational damping effect. To realize the rotational damping, therefore, the rotor or the pendulum must be made of an electrically conductive material, and the other part must be configured as a permanent magnet or electromagnet. If the magnetic field is generated electrically, the degree of damping can be adjusted. In addition or as an alternative, a hydraulic rotational damper can be arranged between the rotor and the each of the two pendulums.

The guide system required to compensate the imbalance-caused forces is, in an advantageous embodiment of the invention, a double-axis linear guide system, also called an XY table or a cross table, which is set up for a translational movement of the rotor and thus of the rotor axis in two axes (X axis, Y axis), which are perpendicular to each other in the plane perpendicular to the rotational axis. The linear guide system preferably connects, as guide elements, the drive stand or the stator (in which case the connection will be direct) to the machine stand of the orbital shaker. The machine stand of the orbital shaker absorbs all of the forces and moments which develop in the orbital shaker and connects the orbital shaker to the environment. The orbital shaker usually stands on several feet, which often comprise elastomeric components, for the purpose of improving the adhesion of the orbital shaker against sliding and also of ensuring a certain isolation of the vibrations.

The advantages of the double-axis linear guide system consist in its compact structure and high load-bearing capacity. As a result of the preferred embodiment of the linear guide system with plain bearings, furthermore, a maintenance-free and frictionally damped movement of the linear guide system is achieved. In addition, the static friction suppresses any remaining vibrations.

If the resistance of the linear guide system to movement is adjustable in both axial directions, it is possible to tune the guide system's behavior with respect to its movement. That is, if the resistance to movement is too strong, the forces introduced into the machine stand will also be too strong. If the resistance to movement is too weak, the movements of the linear guide system during the balancing process will not be damped sufficiently, and the residual vibrations will not be adequately suppressed.

So that the shaker table can be loaded automatically while it is standing still, in one embodiment of the invention, a restoring element moves the drive stand and thus the rotational axis of the rotor back into the same starting position each time.

To reduce the compensating masses arranged in freely movable fashion on each orbit, at least one stationary compensating weight can be arranged additionally on the rotor to compensate imbalance-caused forces and/or moments.

So that not only the imbalance-caused forces but also the imbalance-caused moments can be compensated, the orbital shaker comprises at least two balancing planes arranged with an offset to each other in the direction of the rotational axis. In addition, the previously mentioned circular guide system, which is set up to tilt the rotor around two axes at right angles to each other in a plane which stands perpendicular to the rotational axis, must also be present to compensate the imbalance-caused moments. If only imbalance moments are to be compensated, it is sufficient to provide a circular guide system and a single balancing plane.

To limit the movement of the rotor permitted by the linear guide system and/or the circular guide system during the balancing process, the two guide systems comprise dampers. The damping can be realized by, for example, friction or eddy currents or by a fluid damper.

BRIEF DESCRIPTION OF THE DRAWINGS

The invention is explained in greater detail below on the basis of several exemplary embodiments:

FIG. 3b is a force polygon of the forces which occur during balancing according to FIG. 3a;

DETAILED DESCRIPTION OF THE INVENTION

A first exemplary embodiment of an orbital shaker with automatic compensation of the imbalance force is shown in the drawings of FIGS. 1, 2, 3a, and 3b and will be described in greater detail below:

A machine stand 1 in the form of a base plate is connected by a linear guide system 102, 103 to a drive stand 2 in the form of a motor plate so that relative motion is possible between the two stands. A drive is arranged on the drive stand 2. The drive drives a rotatably supported rotor 3. This rotor 3 is in particular the rotor—an external rotor in the present exemplary embodiment—of an electric motor with a stator 3b (i.e., shown schematically in FIG. 2).

Eccentrically, with a parallel offset "e" to the rotational axis 3a, a shaker table 5 is connected in freely rotatably fashion to the rotor 3 by a rotary joint 4. The rotary joint 4 comprises a pivot pin 4c, which defines the joint axis 4a and is eccentric to the rotational axis 3a, and it also comprises a bearing 4b, which rotatably supports the pivot pin 4c (compare FIG. 4) and is mounted on the bottom of the shaker table 5. The rotary joint 4 makes it possible for the rotor 3 and the shaker table 5 to rotate relative to each other around the joint axis 4a.

At the same time, a guide of the shaker table 5 prevents the shaker table 5 from rotating around the vertical axis. The guide has the effect that the shaker table 5, during its orbital movement, retains it orientation, and thus all points on the surface of the shaker table 5 describe the same orbit as they move, the diameter of this orbit being equal to twice the parallel offset "e" between the rotational axis 3a and the joint axis 4a. This blocking of the rotation of the shaker table 5 around the vertical axis—in the following also called rotational blocking—can be achieved by various types of guides, which are familiar to the expert active in the field of shakers and are therefore not illustrated in FIGS. 1, 2, and 3a for the sake of clarity, but are shown in the exemplary embodiment by way of example in FIGS. 4 and 5.

A tray 6 can be mounted on the shaker table, and the tray can be loaded in turn with the various containers to be shaken. However, the various containers can also be placed directly on the shaker table 5.

Figure 1:
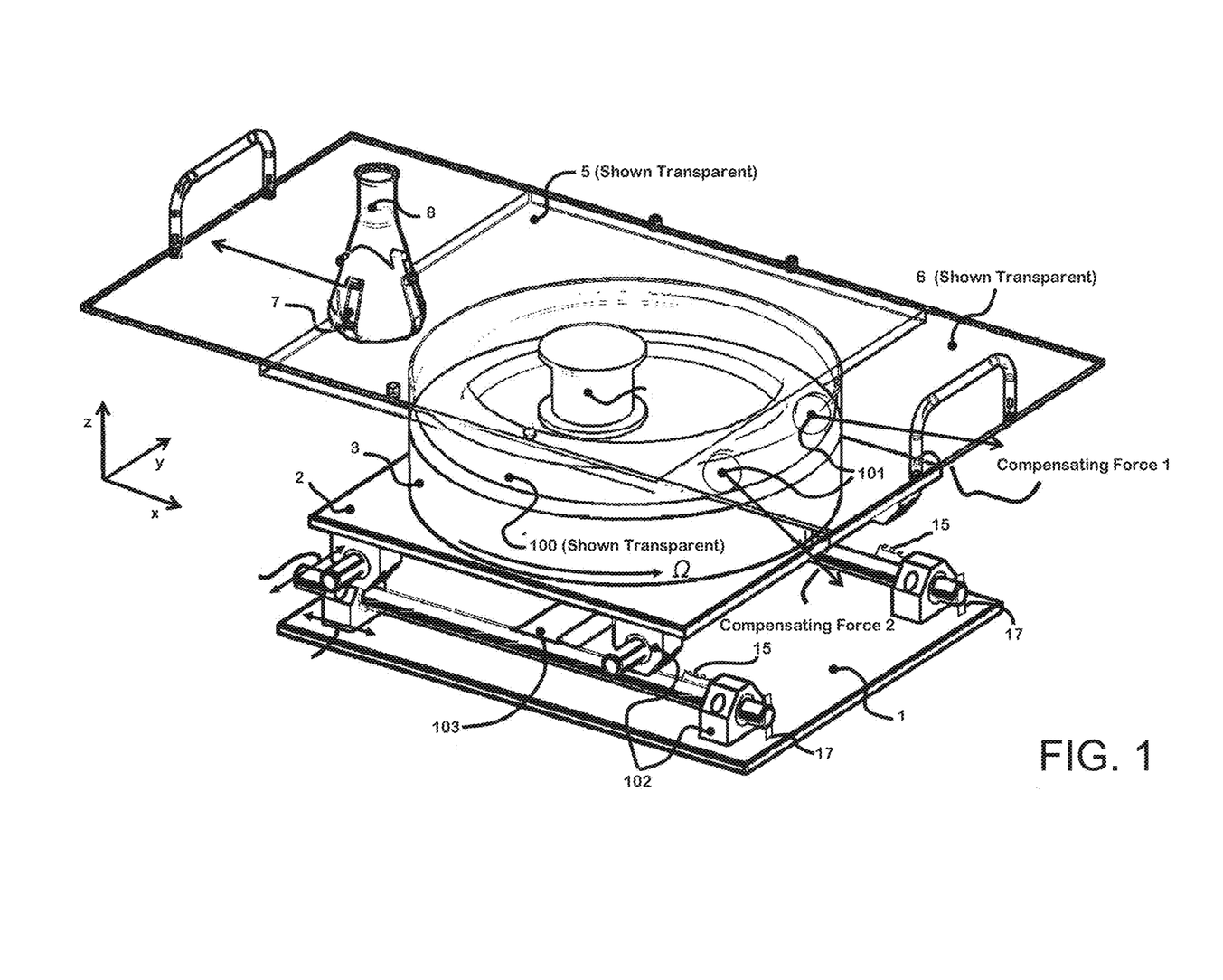
FIG. 1 is a schematic diagram of an exemplary embodiment of the invention with automatic compensation of the imbalance force in a perspective view.
Figure 2:
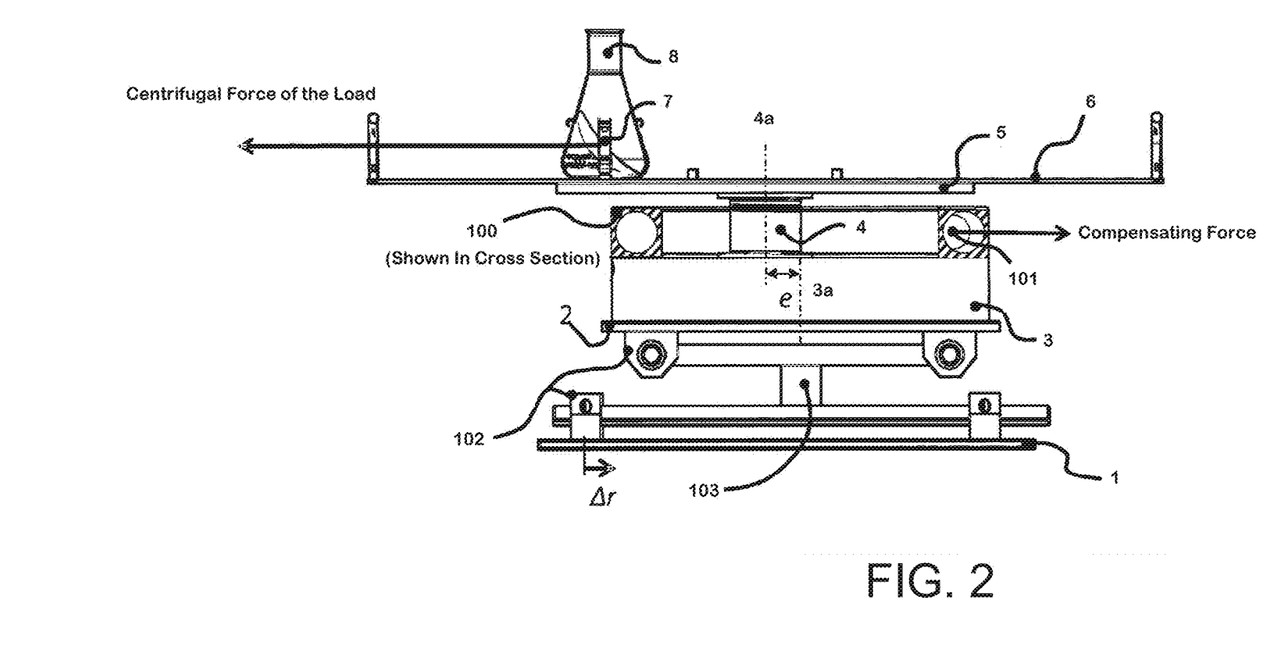
FIG. 2 is a side view of the exemplary embodiment of FIG. 1.
Figure 3A:
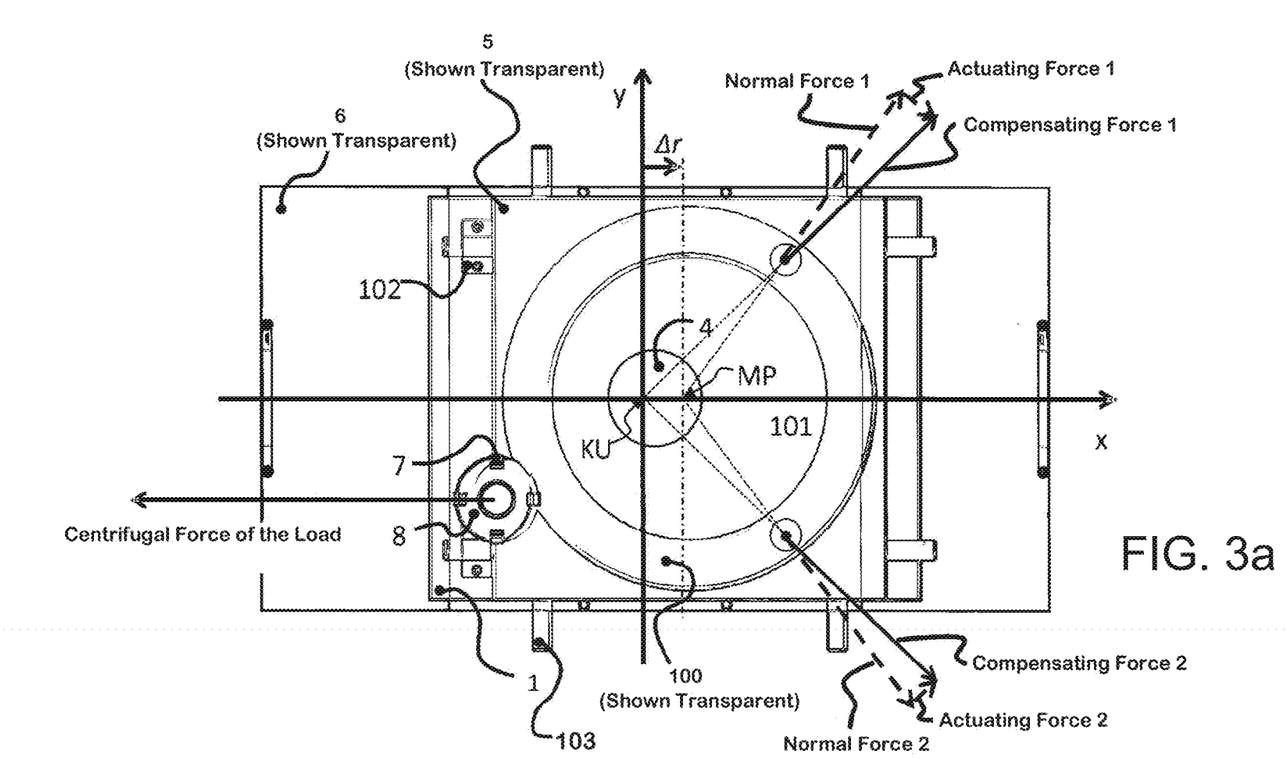
FIG. 3a is a top view of the exemplary embodiment of FIG. 1.
Figure 3B:
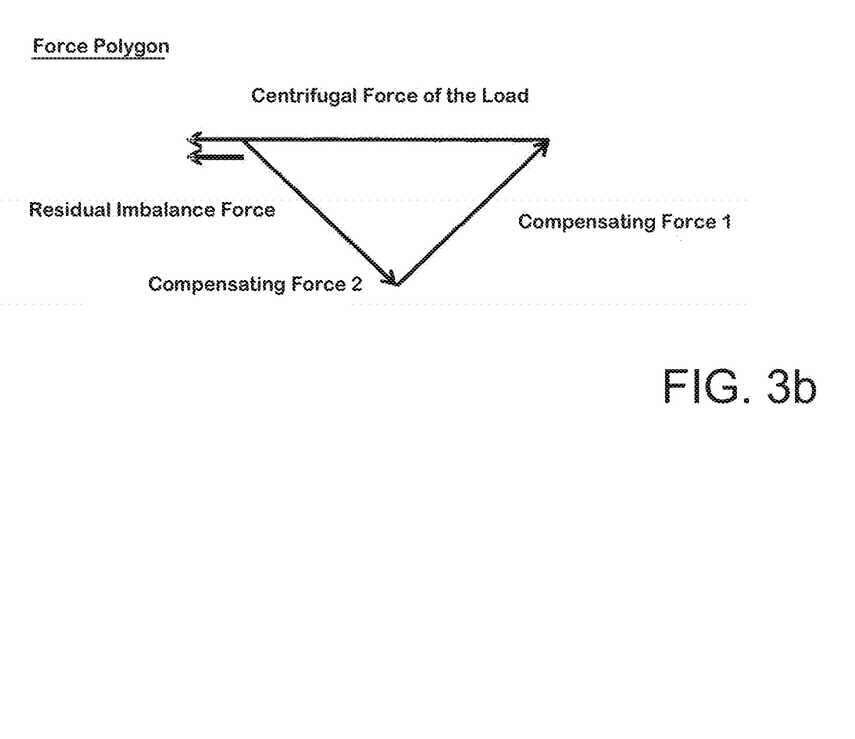

In FIGS. 1, 2, and 3a, the variable load is shown by way of example as a holder 7 and an Erlenmeyer flask 8 to hold the material to be shaken. Although it does not itself rotate, the variable load describes an orbit defined by the parallel offset of the eccentric joint axis 4a to the rotational axis 3a. As a result of the movement of the variable load, a centrifugal force is produced, which causes the entire system to vibrate. The absolute value of the centrifugal force F depends on the mass of the load m, the shaker diameter d=2e, and the angular velocity Ω. The user of the orbital shaker can vary all three parameters within certain limits, which means that the centrifugal force is also variable. The following equation applies here:

$$F = m \cdot \frac{d}{2} \cdot \Omega^2 = m \cdot e \cdot \Omega^2$$

So that the automatic compensating mechanism for compensating the imbalance force is functional, the driven rotor 3 is also movably supported in a plane which is perpendicular to its rotational axis 3a by means of the linear guide system 102, 103. This results in two additional degrees of freedom, namely, translational movement in the x and y directions in a plane perpendicular to the rotational axis of the imbalance. Optionally, this possible movement can be influenced by a restoring and/or damping force, for example by spring 15 shown in FIG. 1. The spring stiffness of the restoring force of a restoring element must be so low that the angular velocity Ω of the drive is in the supercritical range for all rotational speeds required for normal operation of the shaker (it must be greater than the angular eigenfrequencies $\omega_0$ of the movement of the system: $\Omega > \omega_0$).

If a restoring force is not used, the spring stiffness and thus also the angular eigenfrequency $\omega_0$ will both be zero. All operating speeds Ω are therefore greater than the eigenfrequency $\omega_0$ of the movement, and supercritical operation is always guaranteed. Nevertheless, the drive stand 2 in this case is not necessarily always in the same position after balancing. By means of the damping of the linear guide system 102, 103, the movement of the linear guide system 102, 103 can be kept low during start-up and possibly even when passing through the eigenfrequency. The damping can be achieved by friction in the linear guides of the linear guide system and/or by additional components (for example, fluid dampers or eddy-current dampers).

The linear guide system 102, 103 can also comprise mechanical stops 17, which limit the maximum deflection in the direction of the X and Y axes in the plane perpendicular to the rotational axis.

The above-mentioned supercritical operation guarantees a phase angle of more than 90° (ideally, of 180°) between the exciting imbalance force and the deflection of the system in the plane perpendicular to the rotational axis. If, therefore, a resultant residual imbalance force is acting in one direction, the system is deflected in the opposite direction.

Figure 6:
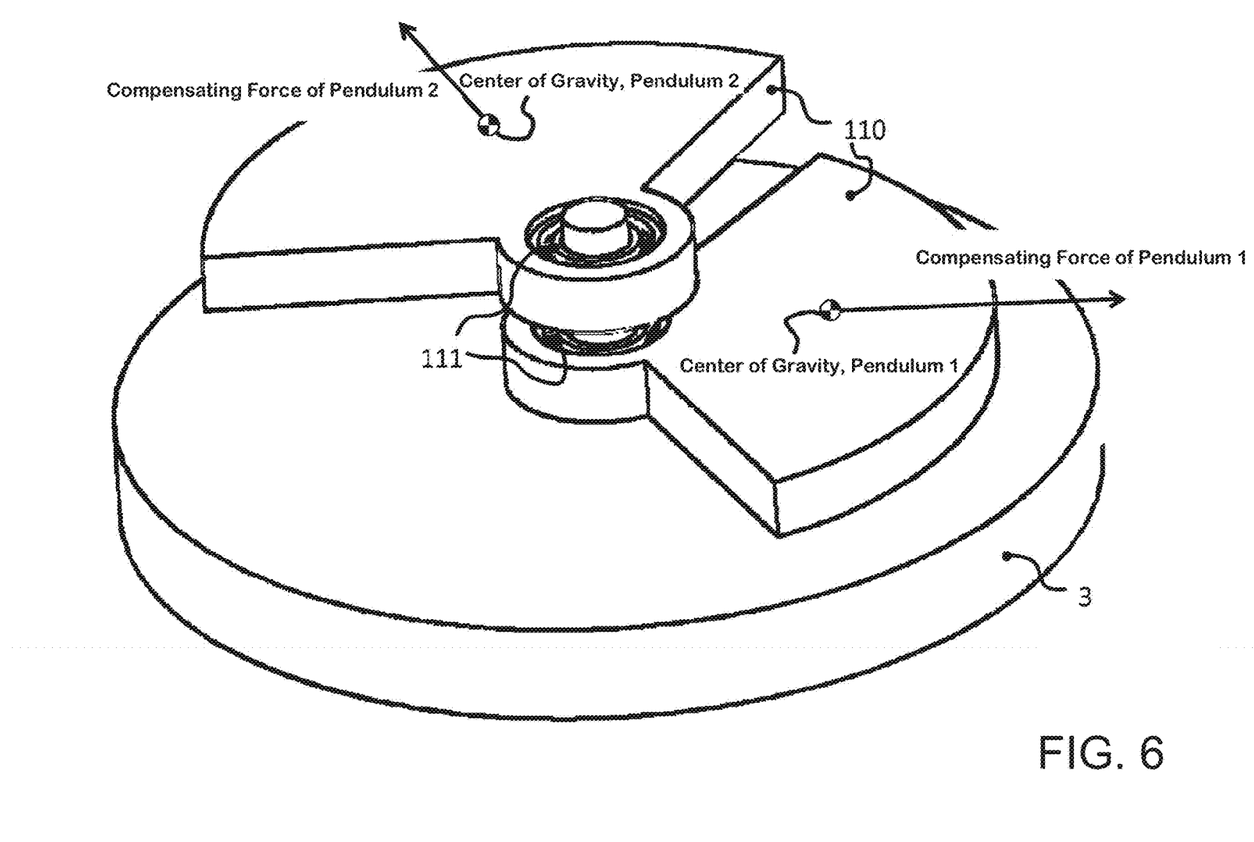
FIG. 6 is a schematic diagram of an arrangement of the compensating masses as pendulums in a perspective view.

The balancing device also comprises at least two compensating masses 101, 110, the centers of mass of which move concentrically on an orbit around the rotational axis 3a of the rotor 3. Such motion on the orbit is possible because, in the FIG. 6 embodiment, the compensating masses 110 configured as pendulums are provided with a support 111 outside their centers of mass, and, in the FIG. 1 embodiment, the compensating masses 101 in the form of rolling elements (balls or cylinders) and/or sliding elements are able to roll and/or slide along a circular guide on one or more orbits. In the exemplary embodiment according to FIGS. 1, 2, and 3a, a ring-shaped channel 100, in which the compensating masses 101, configured as balls, can roll serves as the circular guide. The compensating masses 101 must be able to move in such a way that they can change their position relative to the variable load 7, 8.

Simultaneously, it must be ensured that, in the balanced state, the compensating masses 101 rotate at the same speed as the variable load 7, 8. This is made possible by a velocity-dependent rotational damping mechanism between the rotor 3 and the compensating masses 101. What is meant here by rotational damping mechanism is a means which generates, as a function of the relative rotational speed between the compensating masses 101 and the rotor 3, a directional moment, which reduces the relative rotational speed. The ring-shaped channel 100, in which the compensating masses 101 move, is filled with a fluid to provide the rotational damping mechanism. When pendulums 110 are used, an eddy-current coupling can be used to provide the rotational damping mechanism.

If the orbital shaker is not balanced, the imbalance force brings about a deflection of the drive stand 2 in a plane perpendicular to the rotational axis 3a, i.e., a deflection which trails the force by approximately 180°. Because the compensating masses 101 in this case no longer rotate around the midpoint (MP) of their support, i.e., of the ring-shaped channel (see FIG. 3a) but rather around the unbalanced midpoint, called here the coordinate origin (KU), the centrifugal forces acting on them also have a component acting tangentially to the orbit, designated the restoring force 1, 2 in FIG. 3a. Because of the way in which the pendulums 111 and the ring-shaped channel 100 are supported, however, only forces (except for friction) acting in the direction normal to the orbit can be absorbed, so that the tangential force (restoring forces 1, 2) must generate a change of position of the compensating masses 101 or 110 relative to the joint axis 4a. As soon as the compensating masses 101 or 110 have reached a position which compensates the original imbalance force, the resultant imbalance force and thus also the radial deflection Δr of the motor stand 2 are equal to zero. The points MP and KU then coincide. The compensating masses 101 or 110 now retain their position during operation until the balance state changes. To obtain optimal balancing results, the friction of the compensating masses in the circular guide should be minimized, because otherwise this friction will negatively influence the optimal arrangement of the compensating masses.

The guide system realized in the exemplary embodiment as a linear guide system 102, 103 must first allow the desired translational motion of the rotor 3 in a plane perpendicular to the rotational axis 3a and, second, it must block all other movements. In addition, the guide system absorbs the weight forces. In addition to the linear guide system shown with two crossing linear guides with plain bearings, it is also possible to use linear guides with roller bearings.

The guide system for the rotor 3 can also be built up out of elements with spring elasticity. These must comprise a low spring stiffness in the direction of motion in the plane perpendicular to the rotational axis 3a, so that supercritical operation can be guaranteed and must be as stiff as possible in the other directions (blocking of the motion and absorption of the forces and moments).

An alternative embodiment of a guide system which allows only the desired movements in a plane perpendicular to the rotational axis 3a can be realized by means of, for example, a Schmidt or Kärger coupling.

Figure 4:
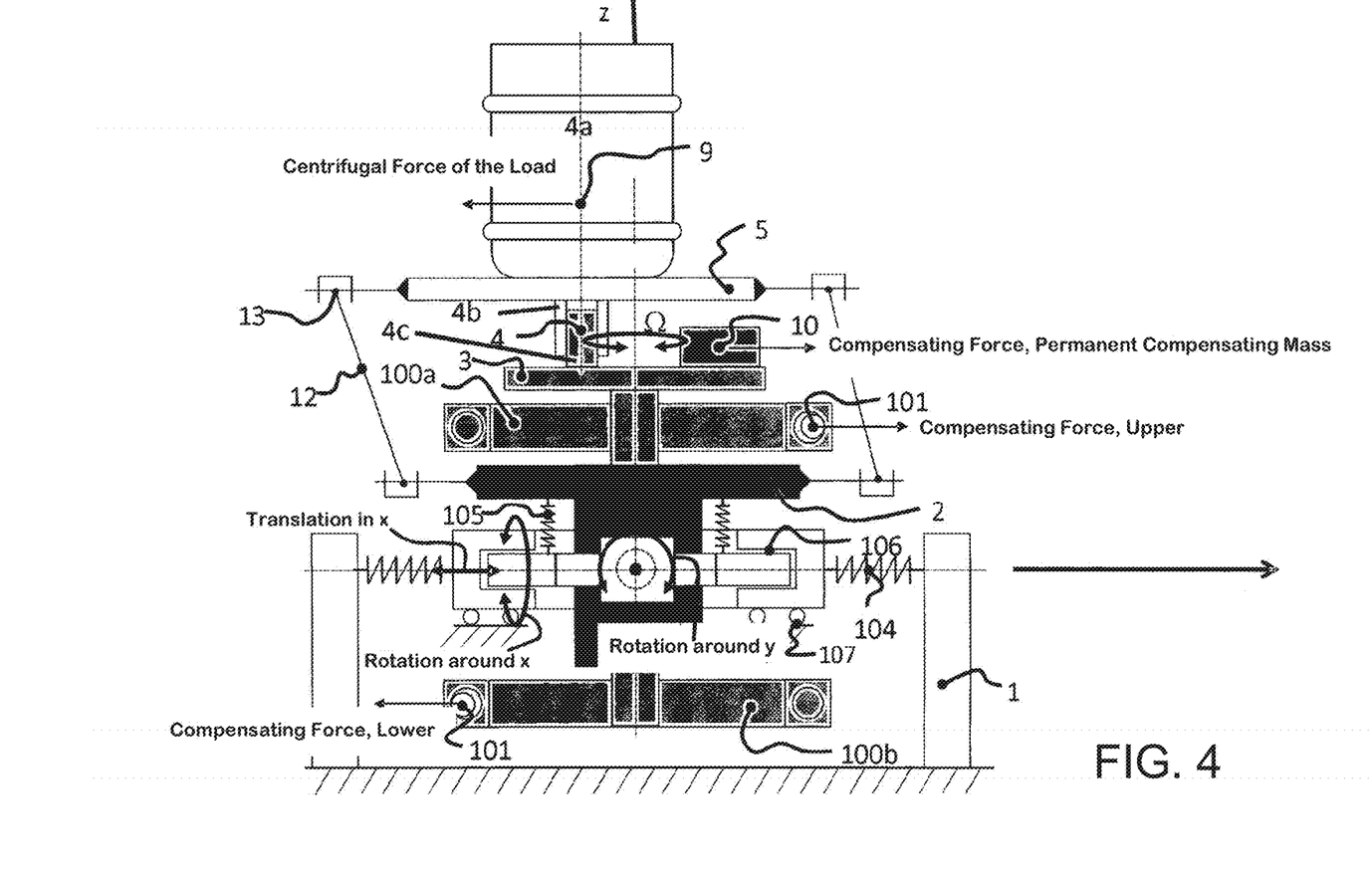
FIG. 4 is a schematic diagram of an exemplary embodiment of the invention with automatic compensation of the imbalance force and of the imbalance moment in a side view.
Figure 5:
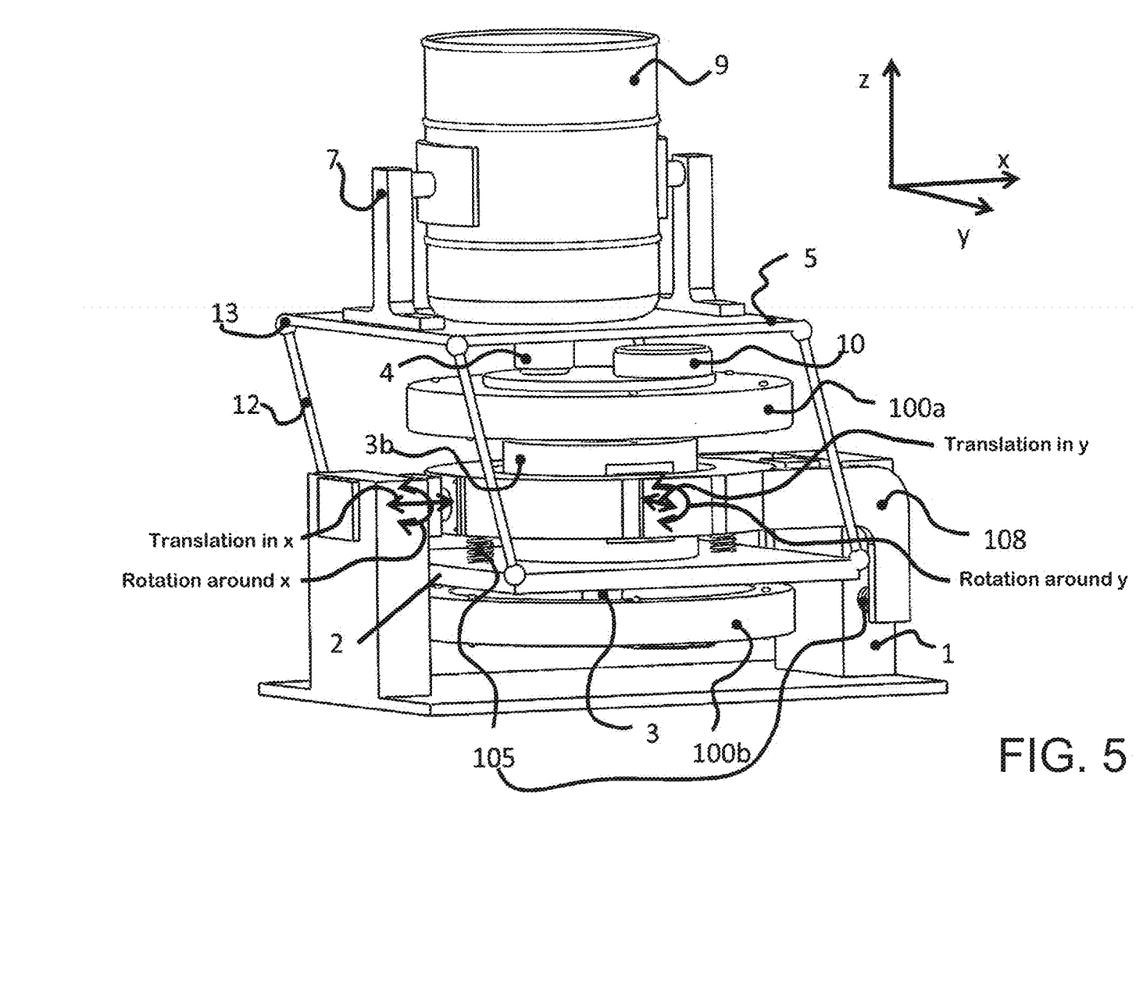
FIG. 5 is a perspective view of the exemplary embodiment illustrated in FIG. 4.

For additional compensation of the moment produced by the imbalance force, the rotor 3 and its rotational axis 3a must be able to move not only in the plane but also to tilt around two axes at right angles to each other in a plane perpendicular to the rotational axis (compare FIGS. 4 and 5). The guide system shown in FIG. 5 comprises an intermediate member 108, which is connected to the machine stand 1 in such a way that it can move translationally and rotationally in and around an x-axis in the plane perpendicular to the rotational axis 3a. This is possible by means of, for example, a combination of rotary joints 106 and sliding joints 107. On this intermediate member 108, the stator of the motor is mounted in such a way that it can move in and around the y-axis in the plane perpendicular to the rotational axis 3a. By means of this serial arrangement, the stator of the motor can, in sum, rotate around the x and y axes and be freely pushed along these axes as well. It therefore has four degrees of freedom.

So that the imbalance moments can be compensated, furthermore, at least two compensating masses 101 in at least one additional balancing plane, which are guided on an orbit in the additional balancing plane, are needed. The exemplary embodiment according to FIGS. 4 and 5 has two ring-shaped channels 100a and 100b, which are offset from each other in the direction of the rotational axis 3a; the compensating masses 101, configured as balls, travel around these channels.

So that the rotor can always be brought back to the same starting position after the end of a shaking operation, it is also possible in this embodiment to use restoring elements, especially to use the springs 104 and 105 shown in FIG. 4, to reverse the tilting and the displacement.

As in the case of an orbital shaker with pure imbalance force compensation, the movements can be damped to avoid large deflections when passing through the eigenfrequency and during the start-up phase.

In FIGS. 4 and 5 as well, the shaft of the motor represents the driven rotor, but here it is configured as an internal rotor. The two ring-shaped channels 100a, 100b are mounted on the rotor 3, so that they rotate with the rotor. In the ring-shaped channels 100a, 100b, an oil is provided for the rotational damping mechanism of the compensating masses 101, which are in the form of the balls. The shaker table 5 is connected to the rotor 3 by a rotary joint 4, which is arranged eccentrically to the rotational axis 3a on the outward-facing end surface of the rotor 3.

As a guide or rotational block for the shaker table 5, several rods 12 are provided, each with a universal joint 13 at both ends. One of the universal joints 13 is connected to the shaker table 5, the other to the drive stand 2, on which the drive is mounted. The guide or rotational block has the effect that the shaker table 5 describes a circular orbit without any change in its orientation. A barrel 9 containing the material to be shaken, representing the load, is present on the shaker table 5.

As long as an imbalance moment is acting, the rotational axis 3a will tilt around the x and y axes. Because the two balancing planes with the ring-shaped channels 100a, 110b are a certain vertical distance away from the x and y axes, the midpoint of the ring-shaped channels 100a, 110b moves back to an orbit around the coordinate origin KU. Here, too, the associated eigenfrequency of the system must be selected so that a phase delay of over 90° is obtained. This is made possible by selecting the lowest possible eigenfrequency. In this case, the deflection of the midpoint (MP) of the ring-shaped channels 100a, 100b leads to actuating forces on the compensating masses, and these continue to act until the imbalance is compensated (similar to the forces shown in FIGS. 2 and 3a for the compensation of the imbalance force alone).

In the embodiment according to FIG. 4, furthermore, a compensating mass 10 is used, which is permanently connected to the rotor 3. This can compensate the imbalance caused by the shaker table 5 and the rotary joint 4 and possibly other components as well, i.e., the imbalance which remains constant upon variation of the load, with the result that only the variable load itself must be balanced by the compensating masses. In addition, this additional mass can also compensate a typical load, especially a load equal to half the maximum load, which means that fewer compensating masses are required in the automatic system.

LIST OF REFERENCE NUMBERS

| No. | Designation |
|---|---|
| 1 | machine stand |
| 2 | drive stand |
| 3 | rotor |
| 3a | rotational axis |
| 3b | stator |
| 4 | rotary joint |
| 4a | joint axis |
| 4b | pivot pin |
| 4c | bearing |
| 5 | shaker table |
| 6 | tray |
| 7 | holder |
| 8 | Erlenmeyer flask |
| 9 | shaker vessel |
| 10 | stationary compensating mass |
| 11 | |
| 12 | rod |
| 13 | universal joint |
| 100 | ring-shaped channel |
| 100a | upper ring-shaped channel |
| 100b | lower ring-shaped channel |
| 101 | compensating mass (ball) |
| 102 | guide system (anti-friction bush) |
| 103 | guide system (coordinate axes) |
| 104 | spring for translational movement |
| 105 | spring for rotational movement |
| 106 | circular guide |
| 107 | translational support |
| 108 | intermediate member |
| 109 | — |
| 110 | compensating mass (pendulum) |
| 111 | support |

The invention claimed is:

1. An orbital shaker comprising
a shaker table with a surface for supporting a load;
a rotor rotatable around a rotational axis;
a drive set up to produce the rotational movement of the rotor;
a rotary joint, which connects the rotor and the shaker table together so that they can rotate freely around a joint axis, which has a parallel offset (e) from the rotational axis;
a table guide connected to the shaker table and configured so that all points of the surface of the shaker table describe a circular orbit with the same diameter as the rotor rotates, the diameter corresponds to twice the parallel offset; and
a balancing device for the automatic compensation of imbalance-caused forces and/or moments including:
at least one balancing plane perpendicular to the rotational axis;
at least one orbit arranged concentrically around the rotational axis in each the at least one balancing plane;
a plurality of compensating masses arranged to move freely on each orbit;
a rotational damping mechanism configured to produce a moment acting on the compensating masses when there is a deviation between the rotational speed of the compensating masses and the rotational speed of the rotor around the rotational axis; and
a guide system configured to allow at least one of a translational movement of the rotor within a plane which is perpendicular to the rotational axis or a tilting of the rotor around two axes which are at right angles to each other and lie in a plane perpendicular to the rotational axis.

2. The orbital shaker according to claim 1, wherein the drive is configured as an electric motor with a stator and the rotor as a movable part.

3. The orbital shaker according to claim 2, wherein the drive is mounted on a drive stand mounted on the guide system.

4. The orbital shaker according to claim 1, wherein the rotary joint comprises a pivot pin, which defines the joint axis and is arranged eccentrically to the rotational axis, and a bearing rotatably supporting the pivot pin.

5. The orbital shaker according to claim 1, wherein the parallel offset (e) between the rotational axis and the joint axis is adjustable.

6. The orbital shaker according to claim 1, wherein at least one circular mass guide is arranged on the rotor along each the at least one orbit to guide the compensating masses on the at least one orbit.

7. The orbital shaker according to claim 6, wherein the at least one circular guide comprises a ring-shaped cavity.

8. The orbital shaker according to claim 1, wherein the compensating masses are rolling elements.

9. The orbital shaker according to claim 7, wherein the rotational damping mechanism includes the ring-shaped cavity filled with a fluid.

10. The orbital shaker according to claim 9, wherein the at least one circular guide comprises at least two ring-shaped cavities with different diameters arranged concentrically around the rotational axis in each balancing plane, wherein the ring-shaped cavities are filled with fluids of different viscosities.

11. The orbital shaker according to claim 7, wherein each circular guide is divided into at least two segments representing part of a circle, and at least one of the compensating masses is arranged to move freely on the at least one orbit in each segment.

12. The orbital shaker according to claim 1, wherein the compensating masses arranged on each orbit are configured as pendulums, each of the pendulums having a center of mass and supported outside the center of mass rotatably around the rotational axis.

13. The orbital shaker according to claim 12, wherein the rotational damping mechanism is one of an eddy-current coupling or a hydraulic rotational damper arranged between the rotor and each of the pendulums.

14. The orbital shaker according to claim 1, wherein the guide system comprises a double-axis linear guide system configured to allow the rotor to move in two axes (X/Y) at right angles to each other in a plane perpendicular to the rotational axis.

15. The orbital shaker according to claim 14, wherein the drive is configured as an electric motor with a stator and the rotor as a movable part, and wherein the linear guide system is connected directly to the stator.

16. The orbital shaker according to claim 14, wherein the drive is configured as an electric motor with a stator and the rotor as a movable part, wherein the drive is mounted on a drive stand mounted on the guide system, and wherein the linear guide system is connected to the drive stand.

17. The orbital shaker according to claim 14, wherein a resistance of the linear guide system to displacement is adjustable in both directions of the two axes.

18. The orbital shaker according to claim 3, wherein at least one restoring element always moves the drive stand back into a same starting position after the rotor has stopped rotating.

19. The orbital shaker according to claim 1, further comprising at least one stationary compensating weight arranged on the rotor to compensate for imbalance-caused forces and moments.

20. The orbital shaker according to claim 1, wherein the at least one balancing plane comprises at least two balancing planes arranged with an offset to each other in the direction of the rotational axis.

21. The orbital shaker according to claim 20, wherein the guide system comprises circular guides configured to allow the rotor to tilt around two axes which are at right angles to each other and are in a plane perpendicular to the rotational axis.

22. The orbital shaker according to claim 20, further comprising at least one damper for damping the movements of the guide system.

23. The orbital shaker according to claim 1, wherein the guide system comprises circular guides configured to allow the rotor to tilt around two axes which are at right angles to each other and are in a plane perpendicular to the rotational axis.

24. The orbital shaker according to claim 1, further comprising at least one damper for damping the movements of the guide system.

* * * * *